United States Patent [19]

Lagelstorfer

[11] Patent Number: 5,934,070
[45] Date of Patent: Aug. 10, 1999

[54] EXHAUST GAS TURBOCHARGER AND EXHAUST GAS MANIFOLD ARRANGEMENT ON AN INTERNAL COMBUSTION ENGINE

[75] Inventor: Kurt Lagelstorfer, Winnenden, Germany

[73] Assignee: Daimler-Benz A.G., Stuttgart, Germany

[21] Appl. No.: 08/871,720

[22] Filed: Jun. 9, 1997

[30] Foreign Application Priority Data

Jun. 28, 1996 [DE] Germany .............................. 196 25 990

[51] Int. Cl.$^6$ ....................................................... F01N 5/04
[52] U.S. Cl. .................... 60/280; 60/302; 60/323
[58] Field of Search ............................ 60/280, 302, 299, 60/323

[56] References Cited

U.S. PATENT DOCUMENTS

| | | |
|---|---|---|
| 2,248,423 | 7/1941 | Buchl . |
| 2,674,086 | 4/1954 | Nichols ..................................... 60/280 |
| 3,102,381 | 9/1963 | Tryhorn ..................................... 60/280 |
| 3,591,959 | 7/1971 | Kubis ....................................... 60/280 |
| 3,798,906 | 3/1974 | Woollenweber ........................... 60/302 |
| 4,288,988 | 9/1981 | Curtil ....................................... 60/313 |
| 4,372,112 | 2/1983 | Ackerman . |
| 4,506,749 | 3/1985 | Sieren . |
| 4,559,776 | 12/1985 | Arai et al. ................................. 60/280 |
| 4,835,963 | 6/1989 | Hardy ....................................... 60/280 |
| 5,211,010 | 5/1993 | Hirota . |
| 5,406,795 | 4/1995 | Raub et al. . |

FOREIGN PATENT DOCUMENTS

| | | |
|---|---|---|
| 0 709 557 | 5/1996 | European Pat. Off. . |
| 2 389 764 | 12/1978 | France . |
| 32 08 478 | 7/1985 | Germany . |
| 35 46 461 | 2/1987 | Germany . |
| 36 41 550 | 3/1988 | Germany . |
| 42 00 611 | 7/1993 | Germany . |
| 55 72628 | 5/1980 | Japan . |
| 55 116452 | 3/1982 | Japan . |
| 281 723 | 12/1926 | United Kingdom . |
| 2 069 604 | 8/1981 | United Kingdom . |

*Primary Examiner*—Thomas E. Denion
*Attorney, Agent, or Firm*—Klaus J. Bach

[57] ABSTRACT

In a turbocharger and exhaust gas manifold arrangement on a multi-cylinder internal combustion engine comprising an exhaust gas manifold with an exhaust gas collection chamber having a discharge flange connected to a connecting flange of an exhaust gas turbocharger, the discharge flange and, accordingly, the turbocharger are arranged at a longitudinal end of the exhaust gas manifold adjacent the front end of the engine.

5 Claims, 3 Drawing Sheets

EXHAUST GAS TURBOCHARGER AND EXHAUST GAS MANIFOLD ARRANGEMENT ON AN INTERNAL COMBUSTION ENGINE

BACKGROUND OF THE INVENTION

The invention relates to an arrangement of an exhaust gas turbocharger and an exhaust gas manifold on a multi-cylinder internal combustion engine wherein the exhaust gas manifold includes exhaust ducts mounted on a cylinder head of the internal combustion engine and a collection chamber to which the exhaust gas turbocharger is mounted by means of a flange.

DE 36 41 550 C1 discloses an arrangement of an exhaust gas turbocharger, a discharge valve and an exhaust gas manifold of a multi-cylinder internal combustion engine wherein the exhaust gas manifold includes duct sections which are separately connected to the various exhaust passages of the cylinder head and which lead to a collection area to which the turbine housing of the exhaust gas turbocharger is connected. In this arrangement, the mounting flange for the turbocharger is disposed in the center of the cylinder block and the various duct sections extend from the cylinder head to the side thereof. Consequently, the arrangement requires a relatively large amount of space and is difficult to fit into a relatively small engine compartment which, of course, also has to accommodate a good number of other components.

Reference is further made to DE 32 08 478 C for additional technical background information.

It is the object of the present invention to provide an exhaust gas turbocharger and an exhaust gas manifold on an internal combustion engine which provides for a compact arrangement and which furthermore facilitates mounting of the arrangement.

SUMMARY OF THE INVENTION

In a turbocharger and exhaust gas manifold arrangement on a multi-cylinder internal combustion engine comprising an exhaust gas manifold with an exhaust gas collection chamber having a discharge flange connected to a connecting flange of an exhaust gas turbocharger, the discharge flange and, accordingly, the turbocharger are arranged at a longitudinal end of the exhaust gas manifold adjacent the front end of the engine.

A particular advantage of the arrangement according to the invention resides in the compact design, particularly with respect to the extension of the exhaust gas manifold in a direction transverse to the longitudinal direction of the engine, and the arrangement of additional components in a very tight space providing however access to all the nuts and bolts. By arranging the exhaust gas turbocharger off center in an area adjacent the front end of the engine a free space remains below the exhaust gas manifold and on the side of the exhaust gas turbocharger for the installation of another component such as a catalytic converter. The arrangement of the exhaust gas manifold directly adjacent the cylinder head and the particular shaping of the flange for mounting the exhaust gas turbocharger provide for short exhaust gas duct sections between the exhaust gas discharge passages of the cylinder head and the collection space of the exhaust gas manifold. In this way, separate exhaust ducts between the cylinder head and the exhaust gas turbocharger are not needed and the arrangement requires little space on the side of the cylinder head. The flange of the exhaust gas manifold is so arranged that an alternator which is arranged at the side of the exhaust gas turbocharger adjacent the cylinder block can be easily mounted. All the mounting bolts and nuts of the arrangement are easily accessible at any time so that the order of mounting of the alternator can be chosen as desired and it can be mounted or removed easily and rapidly.

If the connecting area of the flange is inclined with respect to connecting area of the mounting flange of the exhaust gas manifold, the exhaust gas turbocharger can be mounted directly beneath the exhaust gas manifold whereby the space requirements are further reduced.

With an oval flange opening, the flow cross-section of the flange can be increased while the limitations given by the bolt access areas and the walls of the collection chamber are observed. As a result, the flow of large exhaust gas volumes into the turbine of the turbocharger is facilitated.

With the opening leading to the turbocharger corresponding to the opening in the flange of the exhaust gas manifold, there is a good transition from the collection chamber of the exhaust gas manifold to the inflow passage of the turbine of the turbocharger with only minimal flow losses. Since the flange opening of the exhaust gas turbocharger corresponds to the opening of the exhaust gas manifold flange such that the walls of the collection chamber are in alignment with the walls of the connecting duct the flow losses are also here reduced to a minimum. Further downstream, the connecting duct has a circular cross-section up to the entrance to the turbine of the exhaust gas turbocharger. In order to further improve the inflow of the exhaust gases into the turbine of the exhaust gas turbocharger, the connection opening of the connecting flange may be somewhat larger than the opening of the flange such that, with a possible displacement or casting error of the two flanges, an intrusion of the edges of the connection opening into the flow space is avoided.

With a curved section provided in the exhaust gas manifold at its discharge end adjacent the flange, mounting of the exhaust manifold is further facilitated since the bolts for mounting the exhaust gas turbocharger to the flange which is disposed just before the curved section are easily accessible even if the exhaust gas turbocharger is pre-assembled to the exhaust gas manifold.

Further advantages of the invention will become apparent from the following description of an embodiment of the invention on the basis of the accompanying drawings.

DESCRIPTION OF A PREFERRED EMBODIMENT

Figure 1:
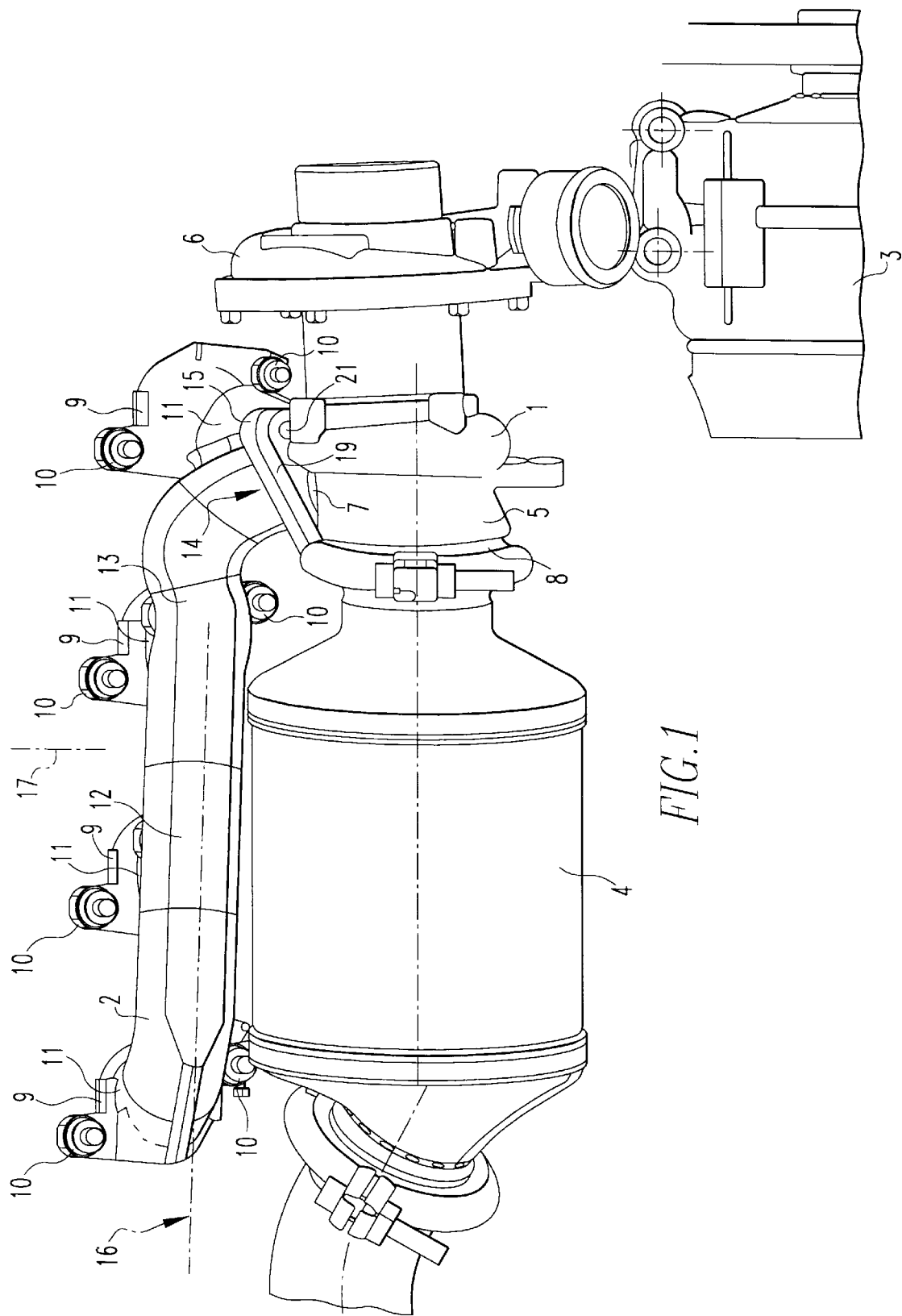
FIG. 1 is a side view of an exhaust gas manifold and a turbocharger as arranged on a multi-cylinder internal combustion engine.

FIG. 1 shows an arrangement of an exhaust gas turbocharger 1 and an exhaust gas manifold 12 of a multi-cylinder internal combustion engine which is not shown, but which includes a generator 3 disposed below the turbocharger 1 and a catalytic converter 4 arranged below the exhaust gas manifold 2. The exhaust gas turbocharger 1 which is arranged on the cylinder block of the internal combustion engine comprises an exhaust gas turbine 5 and a charge air compressor 6, which are both disposed on a common shaft. The exhaust gas manifold 2 is connected to the exhaust gas turbocharger 1 by way of an inlet stub 7 and the catalytic converter 4 is connected to a discharge stub 8 of the exhaust gas turbocharger 1.

On one side of a cylinder head of the internal combustion engine mounting flanges 9 of the exhaust gas manifold 2 are connected to the engine exhaust passages by means of bolts 10. The exhaust passages are in alignment with the respective openings in the mounting flanges 9 of the exhaust gas manifold 2. The exhaust gas manifold 2 comprises exhaust gas duct sections 11 which are mounted to the engine by means of the mounting flanges 9 and which lead to a collection chamber 12 of the exhaust gas manifold 2.

The exhaust gas manifold 2 includes at the end 13 thereof and remote from the exhaust gas duct sections 11, that is essentially opposite therefrom, in the front end area 14 of the engine, a flange 15 which flange is spaced from a plane 16 intersecting the collection chamber 12 and extending normal to a vertical engine axis 17. The flange 15 is connected , by means of a connecting flange 19, with an opening 18 (see FIG. 8) to the inlet stub 7 of the exhaust gas turbine 5.

Figure 2:
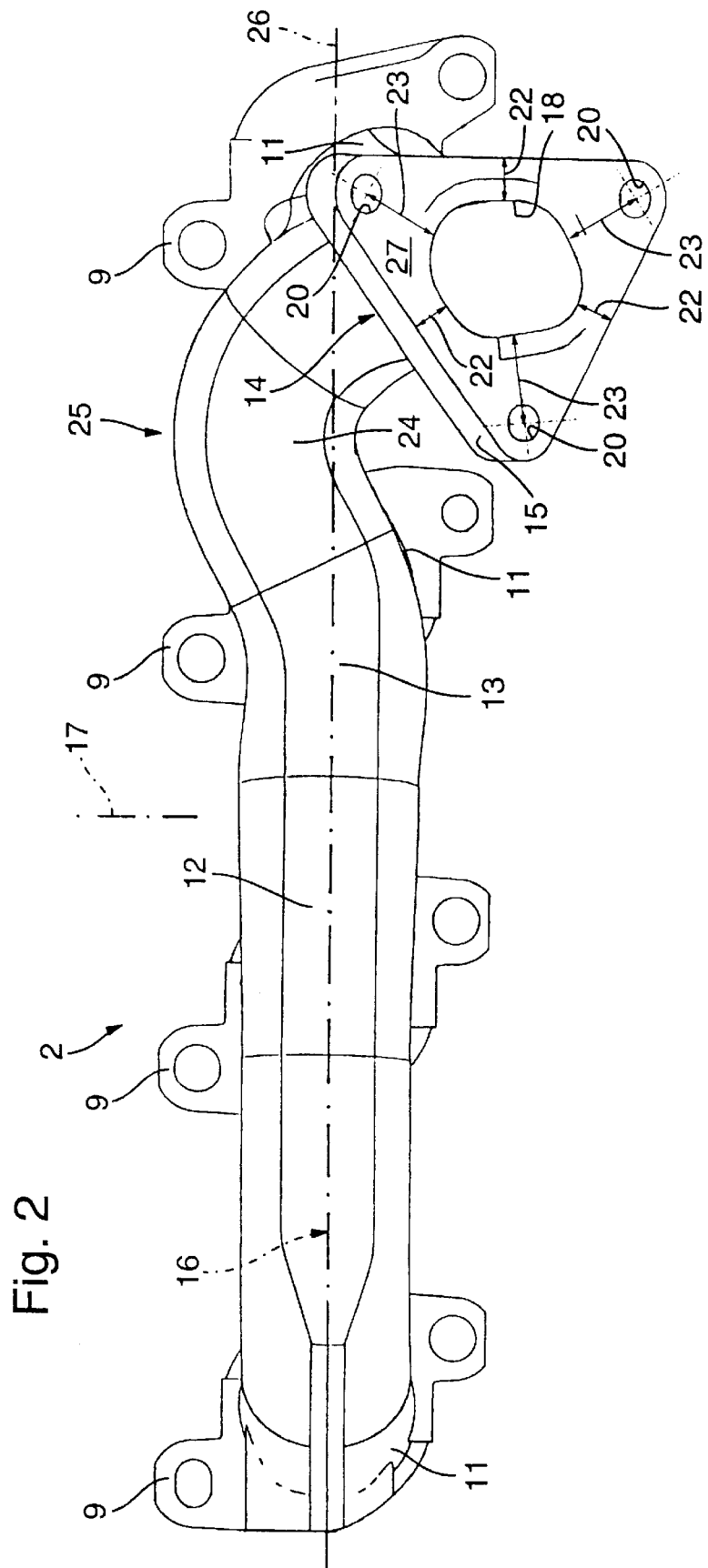
FIG. 2 is a side view of the exhaust gas manifold of FIG. 1 with mounting flanges, an exhaust gas collection chamber and a flange for interconnecting the exhaust gas manifold and the exhaust gas turbocharger.

The flange 15 shown more clearly in FIG. 2 is essentially triangular in shape and has rounded corners with bores 20 extending through the corner areas for receiving mounting bolts. When mounted, the flange bores 20 are in alignment with threaded bores 21 of the connecting flange 19 (see FIG. 1) and bolts extend through the flange bores 20 and are threaded into the threaded bores 21. In this way, the cooperating flanges 15 and 19 of the exhaust gas manifold 2 and the exhaust gas turbocharger 1 are firmly interconnected.

The opening 18 of the flange 15 is essentially oval. This characteristic shape is selected to provide for a relatively large flow cross-section as the cross-section is limited by the wall thickness 22 and distances 23 which need to be maintained between the opening 18 and the flange bores 20. A connection opening of the connecting flange 19 has an oval opening 18 which corresponds to the cross-section of the opening of the flange 15. This oval cross-section is, over the length of a connecting duct to the exhaust gas turbo charger 1 up to the entrance to the spiral chamber of the exhaust gas turbine 5, transformed to a circular cross-section. The cross-section of the connection opening is overall somewhat larger than the cross-section of the opening 18 in order to avoid that, with slight misalignment of the two flanges 15 and 19 or some casting errors, there are no edges projecting into the opening 18 which might generate turbulance in the flow admission area of the turbine.

In order to bring the flange 15 in a predetermined position for mounting the exhaust gas turbocharger 1, the exhaust gas manifold 2 has, at its end 24 adjacent the flange 15, an area 25 wherein the manifold 2 is curved out of its otherwise parallel disposition with respect to the longitudinal engine axis 26 first upwardly in the direction of the vertical engine axis 17 and then downwardly such that the flange 15 is turned somewhat and, at the same time, a large flow cross-section is maintained in the exhaust gas manifold portion leading to the flange 15.

Figure 3:
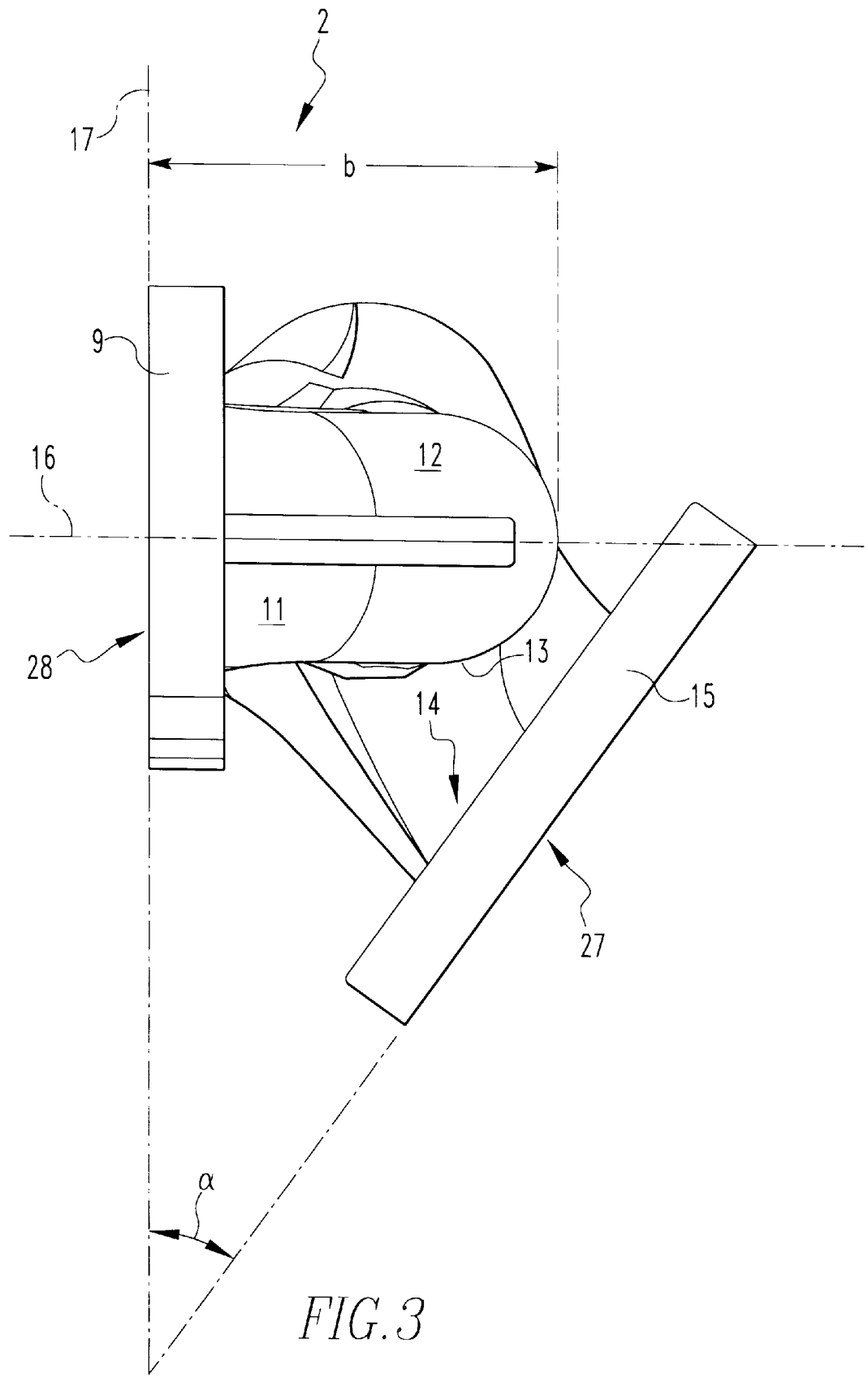
FIG. 3 is end view of the exhaust gas manifold of FIGS. 1 and 2, showing the arrangement of the flanges at the end of the manifold.

FIG. 3 shows the flange 15 with a mounting surface 27 disposed opposite from a mounting surface 28 of the mounting flange 9 of the exhaust gas manifold 2 and inclined thereto at an upwardly open angle $\alpha$.

The width b of the exhaust gas manifold 2 extending normal to the mounting surface 28 of the mounting flange 9 is essentially the same in the direction of the longitudinal engine axis 26.

What is claimed is:

1. A turbocharger and exhaust gas manifold arrangement on a multi-cylinder internal combustion engine comprising an exhaust gas manifold with exhaust gas duct sections having mounting flanges to be mounted to a cylinder head of an internal combustion engine and a collection chamber having a discharge flange arranged at one end, and at a side, of said exhaust gas manifold essentially opposite said exhaust duct sections, and an exhaust gas turbocharger having a connecting flange mounted to said discharge flange for conducting exhaust gas from said collection chamber to said exhaust gas turbocharger, said discharge flange being disposed at a longitudinal end of said exhaust gas manifold adjacent one end of said engine and below a plane extending longitudinally through the collection chamber in a direction normal to a cylinder axis of a respective engine block said exhaust gas turbocharger having an exhaust gas discharge stub having a horizontal axis extending in the longitudinal direction of the engine, a catalytic converter arranged below said exhaust gas manifold at a distance from a plane extending essentially horizontally through said collection chamber of said exhaust gas manifold and being connected to said discharge stub for receiving the exhaust gas from said turbocharger and conducting it to an exhaust pipe connected to said catalytic converter at the other end of said engine.

2. An arrangement according to claim 1, wherein said discharge flange has a mounting surface disposed at an inclination with respect to the mounting surface of said mounting flanges of said exhaust gas manifold.

3. An arrangement according to claim 1, wherein said discharge flange has an opening limited by a predetermined wall thickness of said exhaust gas manifold and by predetermined distances between an opening in said flange and bores for receiving mounting bolts extending through said flange.

4. An arrangement according to claim 1, wherein said discharge flange has an about oval opening.

5. An arrangement according to claim 1, wherein said exhaust gas manifold has a curved end section adjacent said discharge flange.

* * * * *